(12) United States Patent
Sakurai et al.

(10) Patent No.: US 11,754,167 B2
(45) Date of Patent: Sep. 12, 2023

(54) GEAR DEVICE

(71) Applicant: TOYOTA BOSHOKU KABUSHIKI KAISHA, Aichi-ken (JP)

(72) Inventors: Noriyuki Sakurai, Fujisawa (JP); Kohei Izuchi, Fujisawa (JP); Toshiaki Nagata, Aichi-ken (JP)

(73) Assignee: TOYOTA BOSHOKU KABUSHIKI KAISHA, Kariya (JP)

( * ) Notice: Subject to any disclaimer, the term of this patent is extended or adjusted under 35 U.S.C. 154(b) by 356 days.

(21) Appl. No.: 16/589,607

(22) Filed: Oct. 1, 2019

(65) Prior Publication Data

US 2020/0109773 A1 Apr. 9, 2020

(30) Foreign Application Priority Data

Oct. 5, 2018 (JP) .................................. 2018-190223

(51) Int. Cl.
| | | |
|---|---|---|
| *F16H 57/02* | (2012.01) | |
| *F16H 57/023* | (2012.01) | |
| *H02K 7/116* | (2006.01) | |
| *H02K 5/167* | (2006.01) | |
| *F16H 57/021* | (2012.01) | |
| *F16H 25/20* | (2006.01) | |

(52) U.S. Cl.
CPC ......... *F16H 57/023* (2013.01); *H02K 5/1677* (2013.01); *H02K 7/116* (2013.01); *F16H 2025/2031* (2013.01); *F16H 2057/0213* (2013.01)

(58) Field of Classification Search
CPC .......... F16H 57/023; F16H 2025/2031; F16H 2057/0213; H02K 5/1677; H02K 7/116
See application file for complete search history.

(56) References Cited

U.S. PATENT DOCUMENTS

| | | | |
|---|---|---|---|
| 2,313,548 A | 3/1943 | Hoge | |
| 4,643,039 A | 2/1987 | Guichard | |
| 6,404,084 B1 * | 6/2002 | Niki ..................... | H02K 7/1166 310/68 B |
| 6,789,443 B1 * | 9/2004 | Torii ..................... | F16D 41/061 74/425 |
| 9,431,874 B2 * | 8/2016 | Fukuda .................. | H02K 7/116 |

(Continued)

FOREIGN PATENT DOCUMENTS

| | | |
|---|---|---|
| DE | 2313056 A1 | 9/1974 |
| JP | 2003134723 A | 5/2003 |

(Continued)

OTHER PUBLICATIONS

Official Action issued by the U.S. Patent and Trademark Office dated Jun. 29, 2021 in U.S. Appl. No. 16/589,548 (13 pages).

(Continued)

*Primary Examiner* — Zakaria Elahmadi
(74) *Attorney, Agent, or Firm* — BUCHANAN INGERSOLL & ROONEY PC (57) ABSTRACT

A gear device includes a housing, a cover, and a gear. The cover covers an opening of the housing. The gear is accommodated in the housing. One of the housing and the cover includes a projection projected toward the gear and having a center axis that extends along a rotation axis of the gear. The gear includes a recess that receives the projection.

6 Claims, 9 Drawing Sheets

(56) References Cited

U.S. PATENT DOCUMENTS

| | | | |
|---|---|---|---|
| 2009/0071280 A1* | 3/2009 | Nakagawa | F16H 57/039 |
| | | | 74/425 |
| 2012/0258834 A1* | 10/2012 | Winiasz | F03D 15/00 |
| | | | 475/159 |
| 2015/0337957 A1 | 11/2015 | Cyren et al. | |
| 2019/0078910 A1* | 3/2019 | Viebach | G01D 5/147 |
| 2019/0348887 A1* | 11/2019 | Kuehne | F16J 15/447 |
| 2020/0109768 A1 | 4/2020 | Sakurai et al. | |
| 2021/0050763 A1* | 2/2021 | Smith | H02K 11/33 |
| 2021/0251343 A1* | 8/2021 | Martin | A43C 11/165 |

FOREIGN PATENT DOCUMENTS

| | | | | |
|---|---|---|---|---|
| JP | 2007-002975 A | | 1/2007 | |
| JP | 2007002975 A | * | 1/2007 | F16H 57/02 |
| JP | 2012-070564 A | | 4/2012 | |
| JP | 2017034809 A | | 2/2017 | |
| JP | 2019-140875 A | | 8/2019 | |

OTHER PUBLICATIONS

U.S. Appl. No. 16/589,548, filed Oct. 1, 2019, Sakurai et al.
Office Action (Notice of Reasons for Refusal) dated Sep. 27, 2022, by the Japan Patent Office in corresponding Japanese Patent Application No. 2018-190221 and an English Translation of the Office Action. (11 pages).
Office Action (Notice of Reasons for Refusal) dated Sep. 27, 2022, by the Japan Patent Office in corresponding Japanese Patent Application No. 2018-190223 and an English Translation of the Office Action. (8 pages).

* cited by examiner

GEAR DEVICE

BACKGROUND

1. Field

The following description relates to a gear device that includes a gear.

2. Description of Related Art

Japanese Laid-Open Patent Publication No. 2017-34809 describes one example of a gear device.

The gear device described in the above publication is coupled to a motor. The gear device includes a gear, and the gear includes a shaft. The shaft is supported by a housing and a cover.

There is a need for reducing the weight of the gear in the gear device.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A gear device that that is lighter than that of the related art includes a housing, a cover, and a gear. The cover covers an opening of the housing. The gear is accommodated in the housing. One of the housing and the cover includes a projection projected toward the gear and having a center axis that extends along a rotation axis of the gear. The gear includes a recess that receives the projection.

With this structure, the gear is supported by the engagement of the projection, which is provided on one of the housing and the cover, and the recess of the gear. The recess in this structure allows a shaft to be omitted from the gear. This reduces the weight of the gear.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

A gear device is coupled to a motor and various types of actuators. In one example, the gear device is coupled to a motor. A motor unit is one example of a device that includes the gear device.

Figure 1:
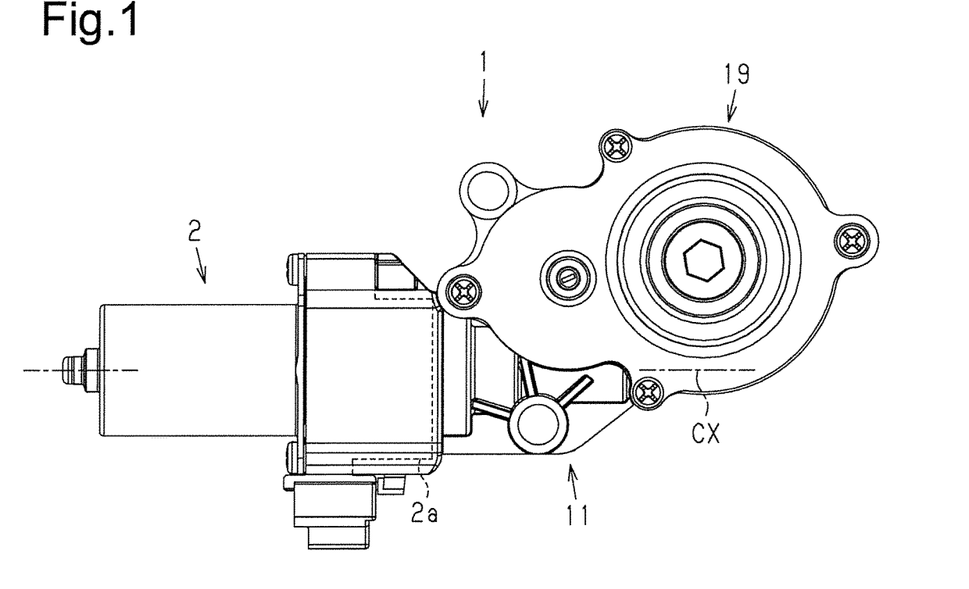
FIG. 1 is a plan view of a motor unit.

FIG. 1 is a plan view of a motor unit 1. For example, the motor unit 1 is coupled to a vehicle seat. In one example, the motor unit 1 serves as a power generator of an actuator to change an inclination angle of a seatback. In another example, the motor unit 1 serves as a power generator of an actuator to move a seatback in a vertical direction. The motor unit 1 includes a motor 2 and a gear device 10. The gear device 10 of the present embodiment reduces the rotation speed of an output shaft of the motor 2.

FIG. 1 shows one example of the motor unit 1. In this example, the motor 2 is a brushed motor. The motor 2 includes a power feeding portion 2a near the output shaft. The gear device 10 is located at one side of the motor 2, that is, in a region where the power feeding portion 2a is located and coupled to the motor 2.

Figure 2:
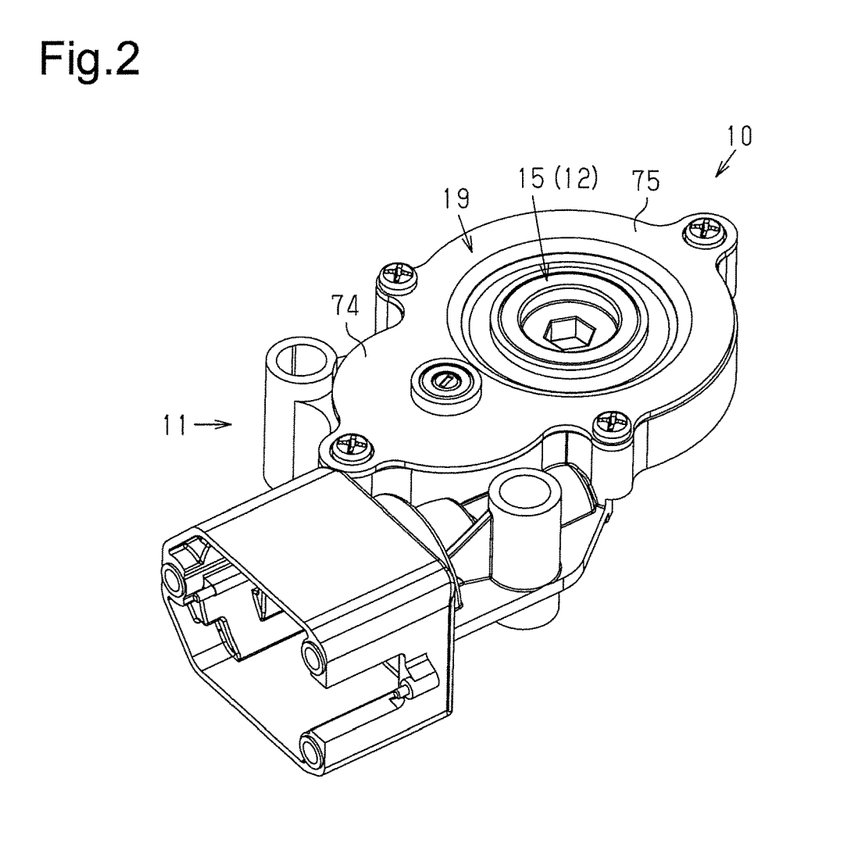
FIG. 2 is a perspective view of a gear device.
Figure 3:
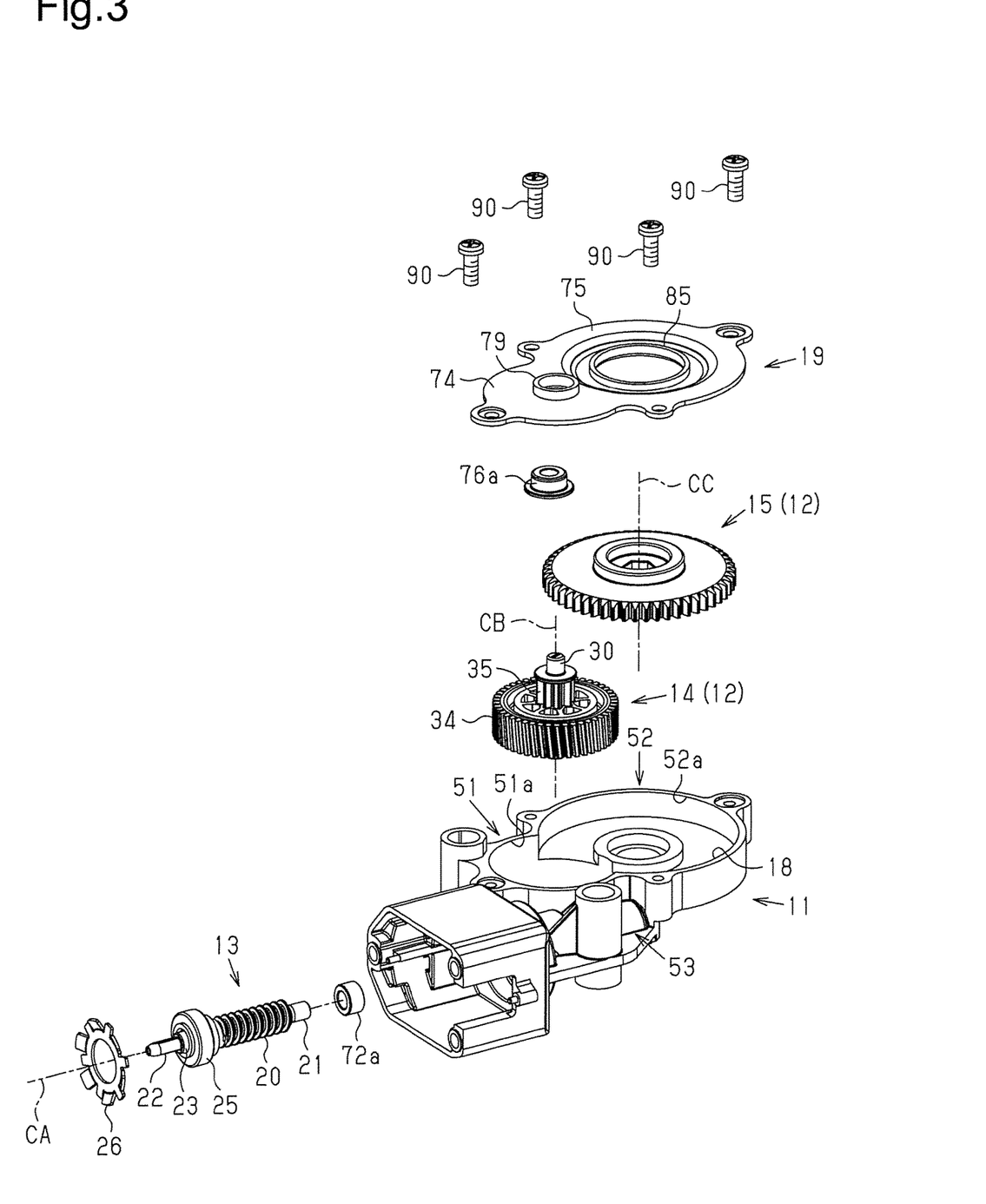
FIG. 3 is an exploded perspective view of the gear device.
Figure 4:
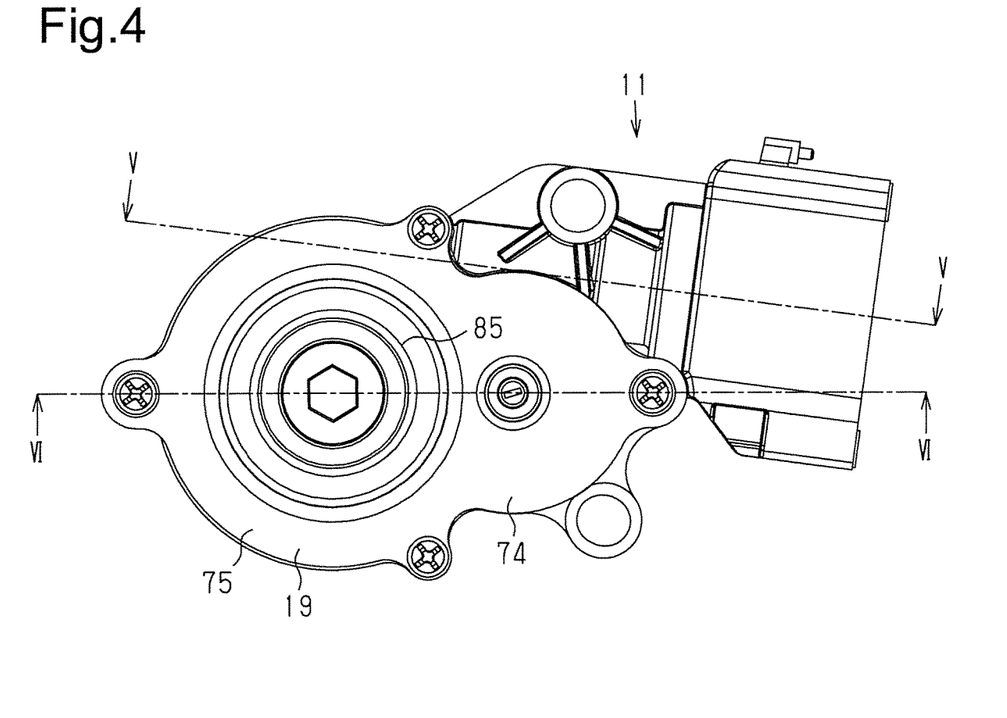
FIG. 4 is a plan view of the gear device.

The gear device 10 will now be described with reference to FIGS. 2 to 12. FIG. 2 is a perspective view of the gear device 10, and FIG. 3 is an exploded perspective view of the gear device 10. FIG. 4 is a plan view of the gear device 10.

As shown in FIG. 3, the gear device 10 includes a housing 11, at least one disc-like gear 12, and a cover 19. The gear 12 is accommodated in the housing 11. The disc-like gear 12 includes a spur gear, a helical gear, and a herringbone gear. In the present embodiment, the gear device 10 includes a worm 13, a worm wheel 14, and a drive gear 15. The worm wheel 14 is moved in cooperation with the worm 13, and the drive gear 15 is moved in cooperation with the worm wheel 14. The worm wheel 14 and the drive gear 15 are both the disc-like gear 12.

The worm 13 is located in the housing 11. Specifically, the worm 13 is accommodated in a third accommodation portion 53 of the housing 11.

The worm 13 includes a worm gear portion 20, a first end 21, a second end 22, and a worm support portion 23. The first end 21 is located at one end of the worm gear portion 20. The second end 22 is located at a side of the worm gear portion 20 opposite to the first end 21. The worm support portion 23 is located between the worm gear portion 20 and the second end 22.

Figure 5:
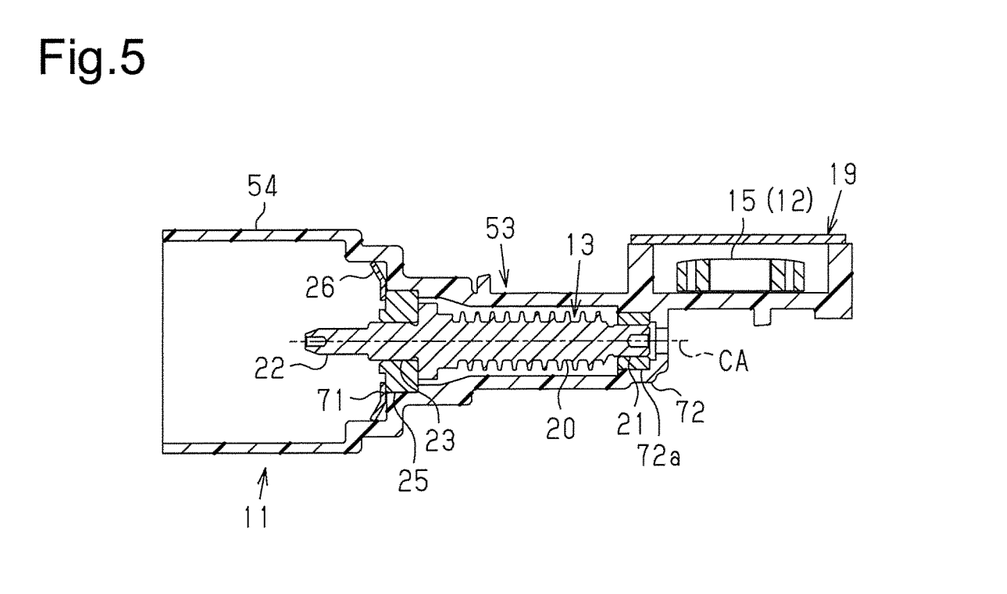
FIG. 5 is a cross-sectional view taken along line V-V in FIG. 4.

As shown in FIG. 5, the first end 21 of the worm 13 is supported by the housing 11. The second end 22 of the worm 13 is connected to the output shaft of the motor 2. A roller 25 is coupled to the worm support portion 23. The worm support portion 23 is rotatably supported in the housing 11 by the roller 25. The worm 13 and the roller 25 are held by a tooth washer 26 and accommodated in the third accommodation portion 53 of the housing 11. This restricts separation of the worm 13 and the roller 25 from the third accommodation portion 53. The worm 13 is joined with the output shaft so that a worm rotation axis CA extends along a rotation axis CX of the output shaft of the motor 2. The worm rotation axis CA may coincide with the rotation axis CX of the output shaft of the motor 2.

As shown in FIG. 3, the worm wheel 14 includes a wheel shaft 30, a first gear 34, and a second gear 35. The wheel shaft 30 includes a first rotation axis CB. The first gear 34 is arranged on the wheel shaft 30 and rotates about the first rotation axis CB. The first gear 34 is meshed with the worm 13. The second gear 35 is arranged on the wheel shaft 30 and rotates about the first rotation axis CB. The second gear 35 has a smaller diameter than the first gear 34. The wheel shaft 30 includes a first end 31 and a second end 32 (refer to FIG. 6). The first end 31 is supported by the housing 11. The second end 32 is supported by the cover 19.

The drive gear 15 includes one or more gears 12. The drive gear 15 is rotated about a second rotation axis CC. In the present embodiment, the drive gear 15 is a third gear meshed with the second gear 35.

Figure 6:
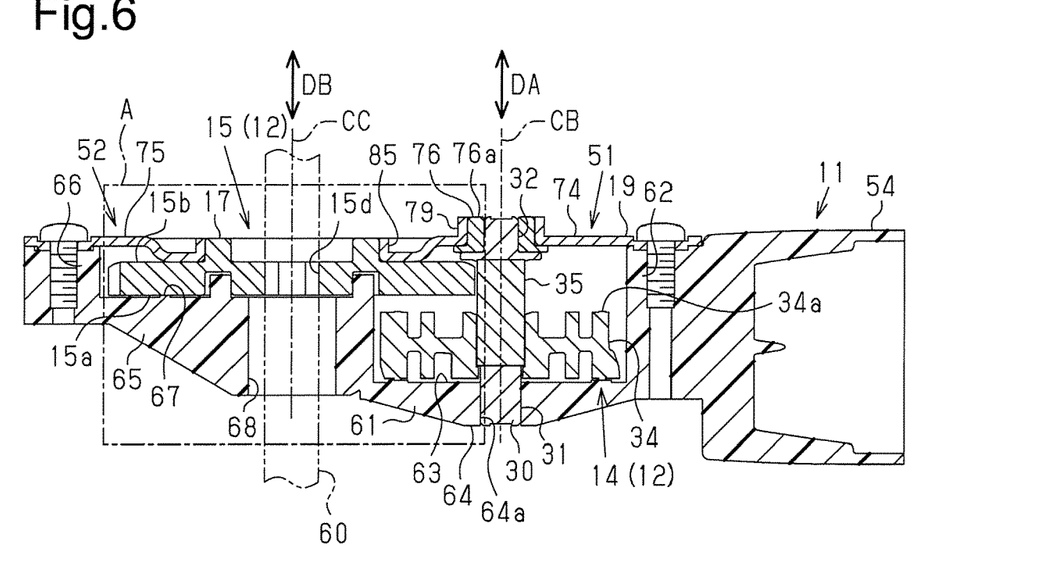
FIG. 6 is a cross-sectional view taken along line VI-VI in FIG. 4.

As shown in FIG. 6, the drive gear 15 is supported to be rotatable relative to the cover 19 and the housing 11. The drive gear 15 is located in an open space between the cover 19 and the housing 11. The drive gear 15 includes a first surface 15a and a second surface 15b. The first surface 15a intersects with the second rotation axis CC. The second surface 15b is located at the opposite side of the first surface 15a in a direction of the second rotation axis CC (hereafter, "second direction DB"). The first surface 15a opposes a second bottom surface 67 of a second accommodation portion 52 of the housing 11. The second surface 15b opposes the cover 19.

Figure 7:
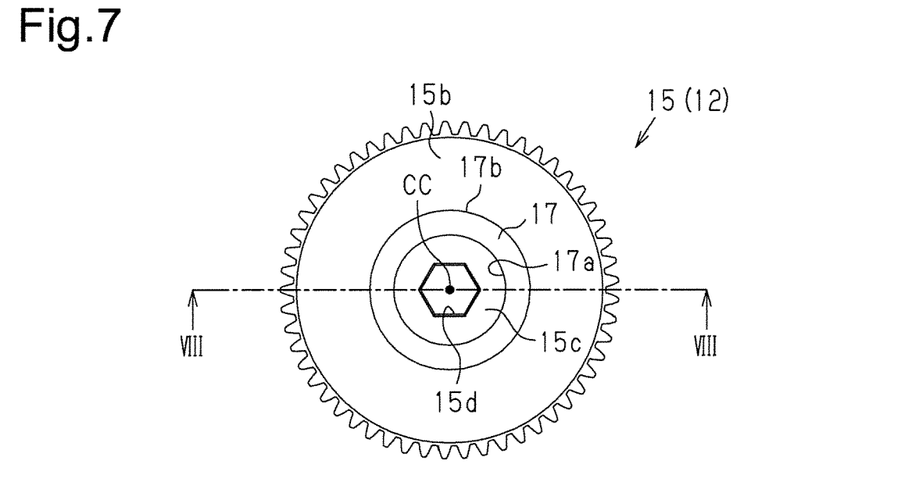
FIG. 7 is a plan view of a drive gear.
Figure 8:
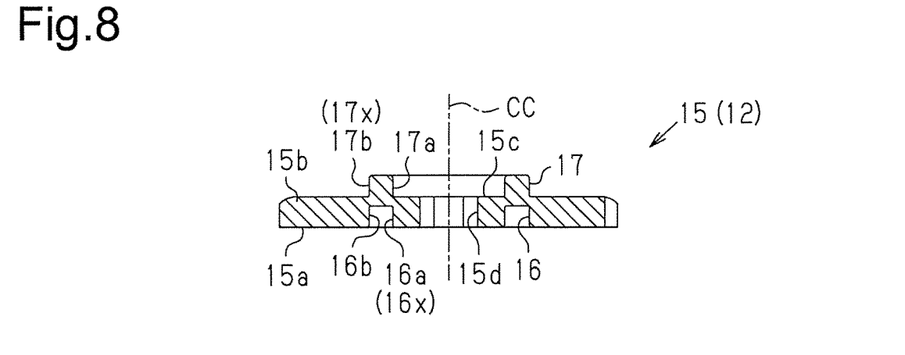
FIG. 8 is a cross-sectional view taken along line VIII-VIII in FIG. 7.

As shown in FIGS. 7 and 8, the first surface 15a of the drive gear 15 includes a recess 16 that extends about the second rotation axis CC. The recess 16 is located radially outward from a coupling portion 15c of the drive gear 15. The recess 16 is annular and surrounds the coupling portion 15c. The recess 16 includes at least one circumferential surface that corresponds to a cylindrical surface extending about the second rotation axis CC. When the recess 16 is annular like in the present embodiment, the recess 16 includes an inner circumferential surface 16a and an outer circumferential surface 16b that has a larger diameter than the inner circumferential surface 16a. The recess 16 includes a first slide surface 16x that slides on a projection 80, which will be described later. The first slide surface 16x is defined by one of the inner circumferential surface 16a and the outer circumferential surface 16b of the recess 16. In the present embodiment, the first slide surface 16x is defined by the inner circumferential surface 16a of the recess 16.

The second surface 15b of the drive gear 15 includes a protrusion 17 that extends about the second rotation axis CC. The protrusion 17 includes at least one circumferential surface corresponding to a cylindrical surface extending about the second rotation axis CC. For example, the protrusion 17 is located radially outward from the coupling portion 15c of the drive gear 15. The protrusion 17 is annular and surrounds the coupling portion 15c. In this case, the protrusion 17 includes an inner circumferential surface 17a and an outer circumferential surface 17b that has a larger diameter than the inner circumferential surface 16a. The protrusion 17 includes a second slide surface 17x that slides on a contact portion 85, which will be described later. The second slide surface 17x is defined by the one of the inner circumferential surface 17a and the outer circumferential surface 17b of the protrusion 17 of the drive gear 15 that is opposite to the circumferential surface of the recess 16 defining the first slide surface 16x. In the present embodiment, the first slide surface 16x is defined by the inner circumferential surface 16a of the recess 16, and the second slide surface 17x is defined by the outer circumferential surface 17b of the protrusion 17. Instead, the first slide surface 16x may be defined by the outer circumferential surface 16b of the recess 16, and the second slide surface 17x may be defined by the inner circumferential surface 17a of the protrusion 17.

The inner circumferential surface 17a and the outer circumferential surface 17b of the protrusion 17 may be aligned with the inner circumferential surface 16a and the outer circumferential surface 16b of the recess 16 when viewed in the second direction DB. The structure in which the protrusion 17 is aligned with the recess 16 can be formed by stamping a plate.

A central portion of the drive gear 15 defines the coupling portion 15c to which a power transmission member 60 is coupled. The coupling portion 15c includes a shaft hole 15d having the second rotation axis CC. The power transmission member 60 is coupled to the shaft hole 15d. The power transmission member 60 transmits power to a device other than the gear device 10. The power transmission member 60 is coupled to the drive gear 15 and rotated integrally with the drive gear 15. The shaft hole 15d is shaped to be non-circular when viewed in the second direction DB. For example, the shaft hole 15d can be rectangular or hexagonal. The power transmission member 60 has a cross section shaped to correspond with the shaft hole 15d.

As shown in FIG. 6, the worm wheel 14 and the drive gear 15 are arranged so that the first rotation axis CB of the wheel shaft 30 is parallel to the second rotation axis CC of the drive gear 15. The drive gear 15 partially overlaps the worm wheel 14 when viewed in the second direction DB. Specifically, part of the drive gear 15 overlaps the first gear 34 when viewed in the second direction DB.

One example of the housing 11 will now be described with reference to FIGS. 5, 6, and 9 to 12. FIG. 11 is a cross-sectional view taken along line XI-XI in FIG. 10.

The housing 11 accommodates the worm wheel 14, the drive gear 15, and the worm 13.

Figure 9:
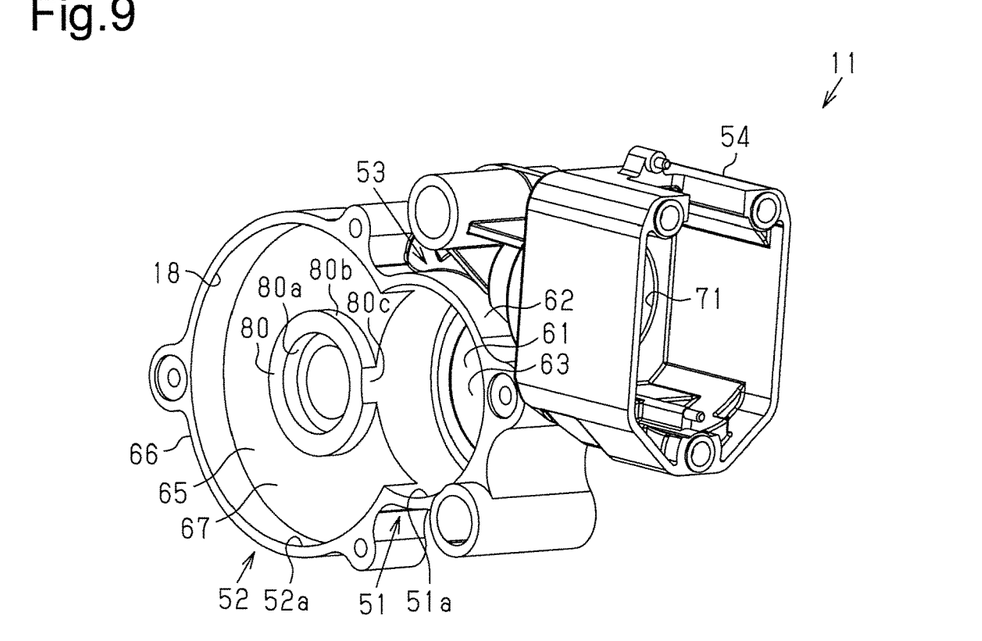
FIG. 9 is a perspective view of a housing.

As shown in FIG. 9, the housing 11 includes a first accommodation portion 51, a second accommodation portion 52, and the third accommodation portion 53. The first accommodation portion 51 accommodates the worm wheel 14, the second accommodation portion 52 accommodates at least part of the drive gear 15, and the third accommodation portion 53 accommodates the worm 13.

The housing 11 may further include a motor coupling portion 54. For example, when the motor 2 is a brushed motor, the motor coupling portion 54 accommodates the power feeding portion 2a that includes a commutator and brushes. The housing 11 is fixed to the motor 2 when the motor coupling portion 54 is fastened by a fastener to the power feeding portion 2a of the motor 2 in a state in which the power feeding portion 2a of the motor 2 is accommodated in the motor coupling portion 54.

As shown in FIGS. 6 and 9, the first accommodation portion 51 includes a first bottom wall 61 and a first circumferential wall 62. The first accommodation portion 51 includes an open end opposite to the first bottom wall 61 in a direction of the first rotation axis CB (hereafter, "first direction DA"). The open end defines a first opening 51a. The first opening 51a is large enough to receive the first gear 34.

The first circumferential wall 62 is cylindrical and faced toward the toothed surface of the first gear 34 and the toothed surface of the second gear 35. The first bottom wall 61 includes a first bottom surface 63 that opposes the first gear 34 (refer to FIG. 6). The first bottom wall 61 includes a first wheel bearing 64 that receives the first end 31 of the wheel shaft 30. The first wheel bearing 64 includes an insertion hole 64a into which the first end 31 of the wheel shaft 30 is inserted.

Figure 10:
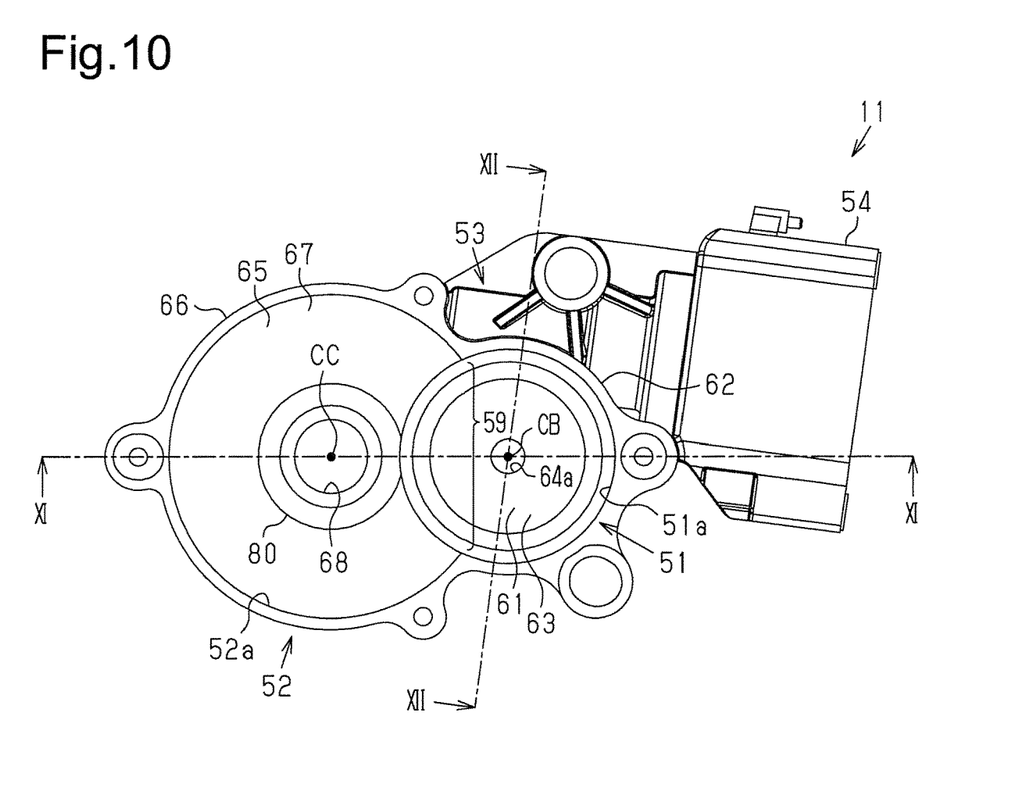
FIG. 10 is a plan view of the housing.
Figure 11:
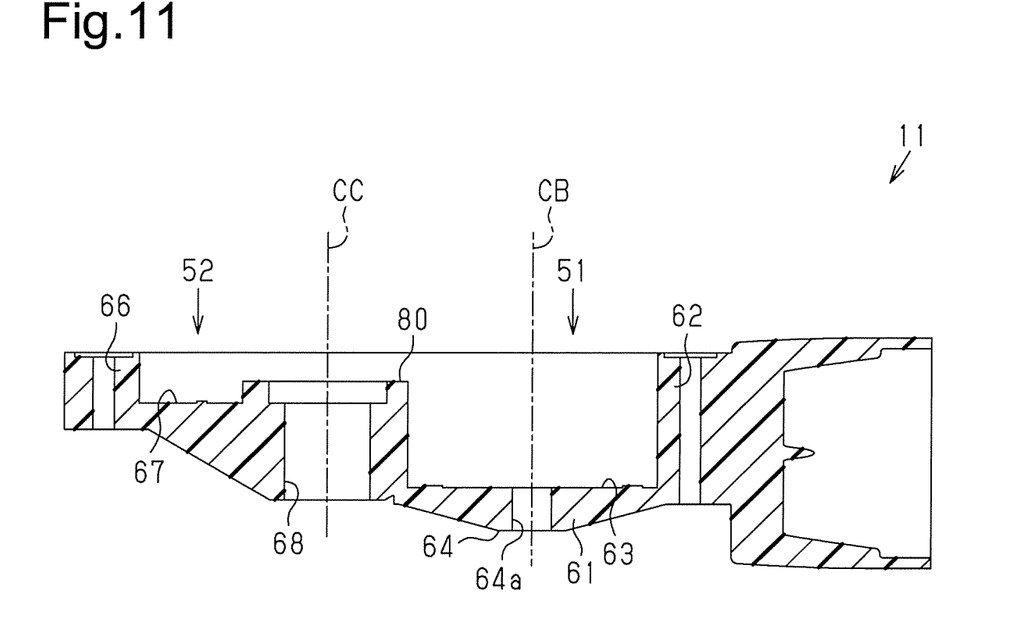
FIG. 11 is a cross-sectional view taken along line XI-XI in FIG. 10.

As shown in FIGS. 9 to 11, the second accommodation portion 52 includes a second bottom wall 65 and a second circumferential wall 66. The second accommodation portion 52 includes an open end opposite to the second bottom wall 65 in the second direction DB. The open end defines a second opening 52a. The second opening 52a is large enough to receive the drive gear 15. The first opening 51a is connected to the second opening 52a. The first opening 51a and the second opening 52a define an opening 18 of the housing 11.

As shown in FIG. 10, when viewed in the second direction DB, the second bottom wall 65 has a shape obtained by cutting out an overlapping portion of a first circle about the second rotation axis CC and a second circle about the first rotation axis CB.

The second bottom wall 65 includes a second bottom surface 67 that opposes the drive gear 15 (refer to FIG. 6). The second circumferential wall 66 faces the toothed surface of the drive gear 15. The portion of the first circumferential wall 62 extending into the second circumferential wall 66 is cut out. The portion of the second circumferential wall 66 extending into the first circumferential wall 62 is cut out. The first accommodation portion 51 is connected with the second accommodation portion 52 through the cutout portions of the first circumferential wall 62 and the second circumferential wall 66 (hereafter, "cutout portion 59"). Part of the drive gear 15 extends out of the cutout portion 59 into the first accommodation portion 51 and is meshed with the second gear 35.

As shown in FIG. 6, the second bottom surface 67 is located closer to the second gear 35 than an opposing surface 34a of the first gear 34 in the first direction DA. The opposing surface 34a of the first gear 34 refers to a surface that opposes the drive gear 15. This prevents interference of the drive gear 15 with the first gear 34. The second bottom wall 65 includes an insertion hole 68 that receives the power transmission member 60.

Figure 12:
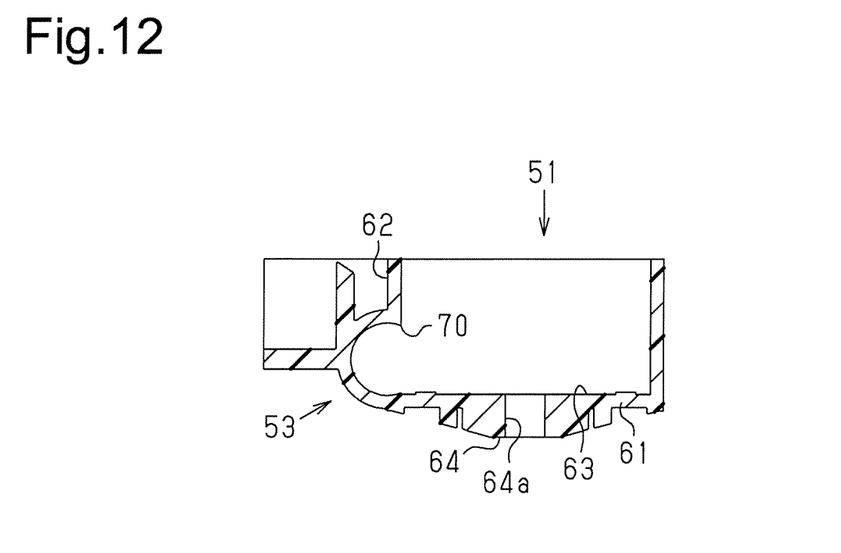
FIG. 12 is a cross-sectional view taken along line XII-XII in FIG. 10.

As shown in FIGS. 10 and 12, the third accommodation portion 53 contacts the first circumferential wall 62 of the first accommodation portion 51.

The third accommodation portion 53 is connected to the first accommodation portion 51 through a connection portion 70 (refer to FIG. 12). The worm 13 extends from the connection portion 70 into the first accommodation portion 51 and is meshed with the first gear 34. The third accommodation portion 53 includes a worm opening 71 that opens toward a direction of the worm rotation axis CA (refer to FIG. 5). When the housing 11 includes the motor coupling portion 54 like in the present embodiment, the worm opening 71 leads into the motor coupling portion 54. The third accommodation portion 53 includes a bearing 72 opposite to the worm opening 71 in the direction of the worm rotation axis CA to receive the worm 13. The bearing 72 includes a bearing member 72a that receives the first end 21 of the worm 13.

As shown in FIGS. 2 and 3, the cover 19 covers the opening 18 of the housing 11. The cover 19 is coupled to the housing 11 by fasteners 90. The cover 19 includes a first cover portion 74 and a second cover portion 75. The first cover portion 74 covers the first opening 51a of the first accommodation portion 51. The second cover portion 75 covers the second opening 52a of the second accommodation portion 52. The first cover portion 74 includes a second wheel bearing 76 that receives the second end 32 of the wheel shaft 30 (refer to FIG. 6). The second wheel bearing 76 is formed, for example, by a bushing 76a. The first cover portion 74 includes a bushing receptacle 79 that receives the bushing 76a. The second cover portion 75 includes the contact portion 85 that contacts the drive gear 15, which will be described later.

Figure 13:
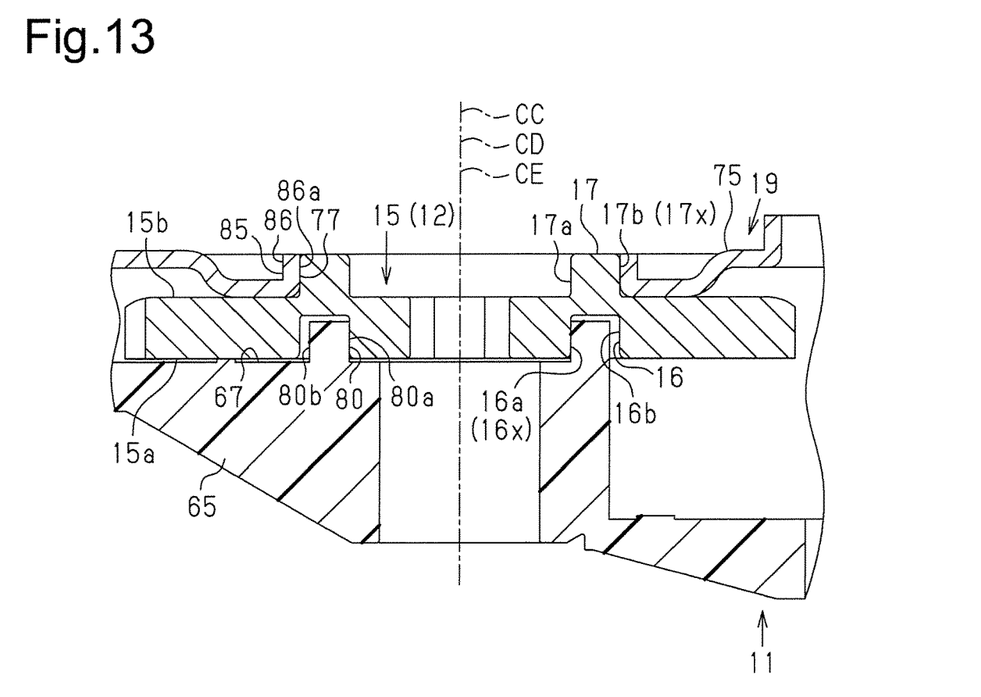
FIG. 13 is an enlarged view of portion A shown in FIG. 6.

A structure rotatably supporting the drive gear 15 and its operation will now be described with reference to FIG. 13.

The drive gear 15 is located between the cover 19 and the housing 11 in a direction of the second rotation axis CC. The first surface 15a of the drive gear 15 slides on the housing 11, and the second surface 15b slides on the cover 19.

One of the housing 11 and the cover 19 includes the projection 80. Specifically, one of the housing 11 and the cover 19 that opposes the recess 16 of the drive gear 15 includes the projection 80.

The projection 80 is projected toward the drive gear 15. The projection 80 includes a center axis CD that extends along the second rotation axis CC. The center axis CD may coincide with the second rotation axis CC. The projection 80 includes at least one circumferential surface corresponding to a cylindrical surface extending about the center axis CD. The projection 80 may be annular like in the present embodiment. The projection 80 extends into the recess 16 of the drive gear 15. The circumferential surface of the projection 80 slides on the circumferential surface (inner circumferential surface 16a or outer circumferential surface 16b) of the recess 16 of the drive gear 15.

In the present embodiment, the annular projection 80 is located on the second bottom surface 67 of the second bottom wall 65 of the housing 11. The projection 80 includes an inner circumferential surface 80a and an outer circumferential surface 80b. The inner circumferential surface 80a of the projection 80 is in slidable contact (hereafter, "inner slidable contact") with the inner circumferential surface 16a of the recess 16 of the drive gear 15. Further, the outer circumferential surface 80b of the projection 80 is in slidable contact (hereafter, "outer slidable contact") with the outer circumferential surface 16b of the recess 16 of the drive gear 15. The projection 80 and the recess 16 are configured so that one of the inner slidable contact and the outer slidable contact occurs frequently. At least one of the inner circumferential surface 80a and the outer circumferential surface 80b of the projection 80 corresponds to a cylindrical surface. Further, at least one of the inner circumferential surface 16a and the outer circumferential surface 16b of the recess 16 corresponds to a cylindrical surface. For the inner slidable contact, the outer circumferential surface 80b of the projection 80 and the outer circumferential surface 16b of the drive gear 15 do not have to be truly cylindrical surfaces. For example, in the arrangement of the first accommodation portion 51 and the second accommodation portion 52, the first accommodation portion 51 may be located close to the second accommodation portion 52 so that the first accommodation portion 51 overlaps with the outer circumferential surface 80b of the projection 80. In this case, a concave surface 80c is formed in the outer circumferential surface 80b of the projection 80. The concave surface 80c forms part of the inner circumferential surface of the first circumferential wall 62 of the first accommodation portion 51 (refer to FIG. 9). In the present embodiment, the inner circumferential surface 16a of the recess 16 in the drive gear 15 includes the first slide surface 16x, which slides on the projection 80, so that the inner slidable contact occurs frequently.

The one of the housing 11 and the cover 19 that does not have the projection 80 includes the contact portion 85 that contacts the protrusion 17 of the drive gear 15. Specifically, the one of the housing 11 and the cover 19 that opposes the protrusion 17 of the drive gear 15 in a radial direction includes the contact portion 85.

The contact portion 85 contacts the protrusion 17 of the drive gear 15. The contact portion 85 contacts the protrusion 17 of the drive gear 15 and stabilizes the rotation of the drive gear 15. The contact portion 85 includes a center axis CE that extends along the second rotation axis CC. The center axis CE may coincide with the second rotation axis CC. The contact portion 85 includes at least one circumferential surface corresponding to a cylindrical surface extending about the second rotation axis CC. The contact portion 85 slides on the circumferential surface (inner circumferential surface 17a or outer circumferential surface 17b) of the protrusion 17 of the drive gear 15.

In the present embodiment, the second cover portion 75 of the cover 19 includes an insertion hole 77 that receives the power transmission member 60. The contact portion 85 extends around the insertion hole 77. For example, the contact portion 85 is defined by a circumferential wall 86 extending around the insertion hole 77. In the present embodiment, the circumferential wall 86 includes an inner circumferential surface 86a that slides on the outer circumferential surface 17b of the protrusion 17 of the drive gear 15. Thus, in the present embodiment, the second slide surface 17x, which slides on the contact portion 85, is defined by the outer circumferential surface 17b of the protrusion 17 of the drive gear 15.

The present embodiment has the following advantages.

(1) In the gear device 10, one of the housing 11 and the cover 19 includes the projection 80. The projection 80 projects toward the drive gear 15 and includes the center axis CD that extends along the second rotation axis CC of the drive gear 15. The drive gear 15 includes the recess 16 that receives the projection 80.

With this structure, the drive gear 15 is supported by the projection 80, which is arranged on one of the housing 11 and the cover 19, and the recess 16 of the drive gear 15, which is engaged with the projection 80. In this way, the drive gear 15 includes the recess 16 instead of a projection. This reduces the weight of the drive gear 15.

(2) In the gear device 10, one of the surfaces of the drive gear 15 in the direction of the second rotation axis CC, namely, the surface 15a, includes the recess 16. The other one of the surfaces of the drive gear 15 in the direction of the second rotation axis CC, namely, the surface 15b, includes the protrusion 17, which is coaxial with the recess 16. The one of the housing 11 and the cover 19 that does not have the projection 80 includes the contact portion 85 that contacts the protrusion 17 of the drive gear 15. With this structure, the drive gear 15 is supported by the projection 80, which is located on one of the housing 11 and the cover 19, and the contact portion 85, which is located on the other one of the housing 11 and the cover 19.

(3) In the gear device 10, the central portion of the drive gear 15 includes the coupling portion 15c to which the power transmission member 60 is coupled. The recess 16 and the protrusion 17 of the drive gear 15 are located radially outward from the coupling portion 15c. This structure increases the area of contact between the recess 16 and the projection 80 and between the protrusion 17 and the contact portion 85 in comparison with when the recess 16 and the protrusion 17 are located in the central portion of the drive gear 15. This reduces local wear that occurs in the recess 16 and the protrusion 17.

(4) The recess 16 of the drive gear 15 may include the first slide surface 16x that slides on the projection 80. The first slide surface 16x is defined by one of the inner circumferential surface 16a and the outer circumferential surface 16b of the recess 16 of the drive gear 15. The protrusion 17 of the drive gear 15 includes the second slide surface 17x that slides on the contact portion 85. The second slide surface 17x is defined by the one of the inner circumferential surface 17a and the outer circumferential surface 17b of the protrusion 17 of the drive gear 15 that is opposite to the circumferential surface of the recess 16 defining the first slide surface 16x.

The combination of the inner circumferential surface 16a of the recess 16 and the outer circumferential surface 17b of the protrusion 17 or the combination of the outer circumferential surface 16b of the recess 16 and the inner circumferential surface 17a of the protrusion 17 can be formed with high dimensional accuracy by performing stamping. Thus, the above structure allows stamping to be performed to form the drive gear 15 without causing wobbling of the drive gear 15.

(5) The recess 16 of the drive gear 15 may be annular. The projection 80 of the housing 11 is configured to be annular so as to be fitted into the recess 16 of the drive gear 15. The inner circumferential surface 80a of the projection 80 of the housing 11 slides on the recess 16.

With this structure, the inner circumferential surface 80a of the projection 80 of the housing 11 slides on the recess 16 more frequently, and the outer circumferential surface 80b of the projection 80 slides on the recess 16 less frequently. Thus, the degree of freedom is increased for the shape of the outer circumferential surface 80b of the projection 80. This, in turn, increases the degree of freedom for the shape of the structure around the projection 80 in the housing 11. For example, the first accommodation portion 51 can be located close to the second accommodation portion 52, and the concave surface 80c can be formed in the outer circumferential surface 80b of the projection 80 like in the present embodiment.

OTHER EMBODIMENTS

The above embodiment is not limited to the example of the above structure. The above embodiment may be changed as described below. The same reference numerals are given to those components that are the same as the corresponding components of the above embodiment.

The support structure of the drive gear 15 in which the drive gear 15 is engaged with the housing 11 or the cover 19 described in the present embodiment can be applied to the gear 12 regardless of function. In the present embodiment, the drive gear 15 transmits rotational driving force to the outside of the gear device 10. The support structure of the embodiment can be applied to an intermediate gear that transmits rotational force to the drive gear 15. Further, the support structure of the embodiment can be applied to the gear 12, which receives rotational force from the worm 13. Moreover, the support structure of the embodiment can be applied to the gear 12 that includes a disc-like portion.

Another example in which the drive gear 15 is rotatably supported will now be described with reference to FIG. 14.

Figure 14:
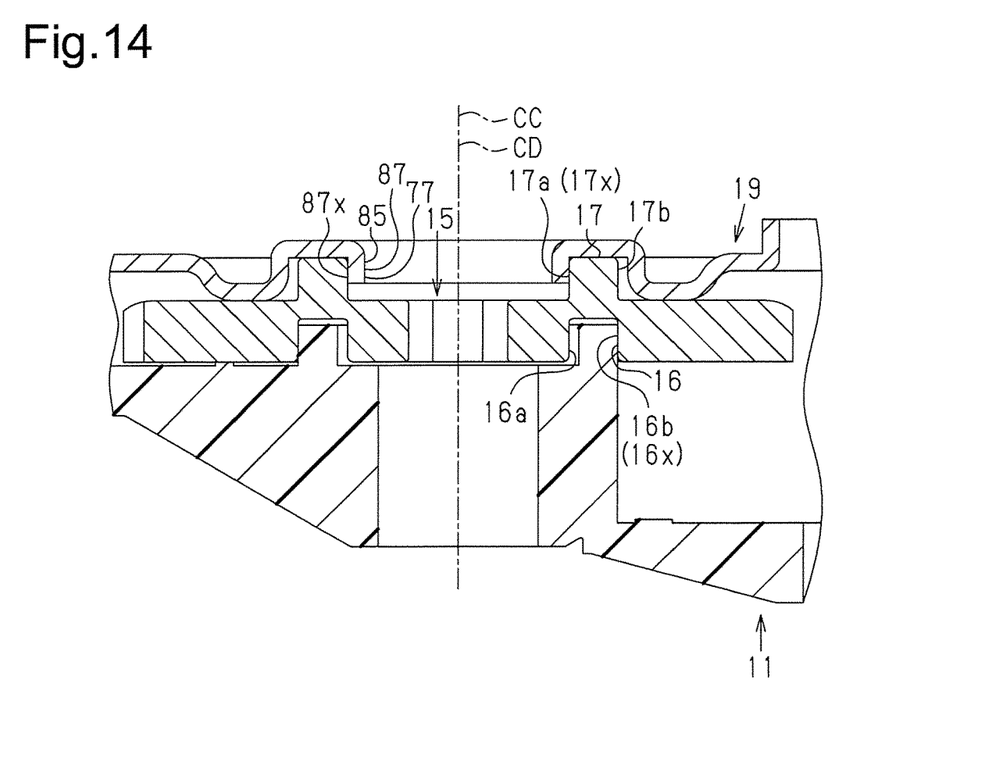
FIG. 14 is a cross-sectional view showing a gear device including a support structure for a drive gear in another embodiment.

In the example shown in FIG. 14, the first slide surface 16x is defined by the outer circumferential surface 16b of the recess 16 of the drive gear 15. The second slide surface 17x is defined by the inner circumferential surface 17a of the protrusion 17 of the drive gear 15. The contact portion 85 of the cover 19 is hook-shaped to contact the inner circumferential surface 17a of the protrusion 17 of the drive gear 15. The contact portion 85 is defined by a circumferential wall 87 extends around the insertion hole 77. The circumferential wall 87 projects toward the drive gear 15. The circumferential wall 87 includes an inner circumferential surface 87x that contacts the inner circumferential surface 17a of the protrusion 17 of the drive gear 15.

Another example in which the drive gear 15 is rotatably supported will now be described with reference to FIG. 15.

Figure 15:
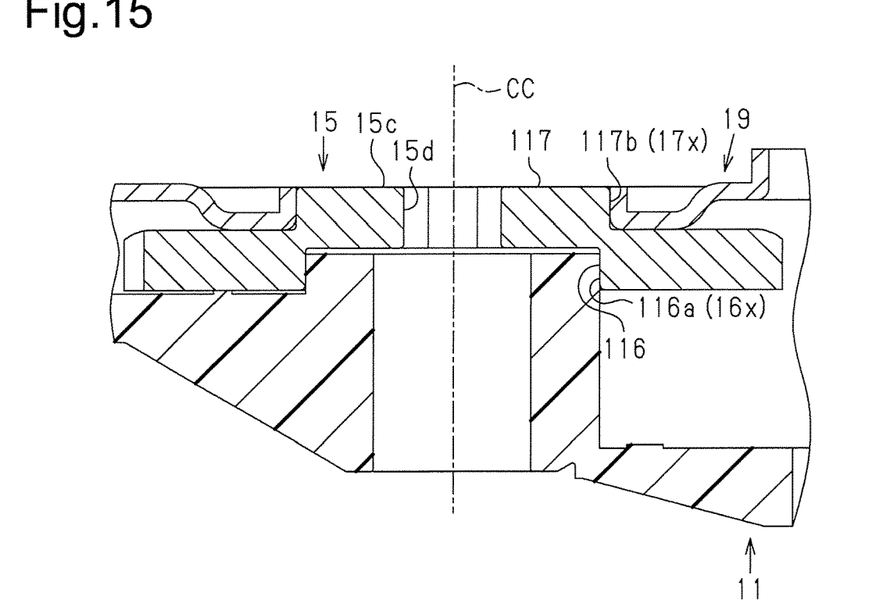
FIG. 15 is a cross-sectional view showing a gear device including a support structure for a drive gear in another embodiment.

In the example shown in FIG. 15, the first slide surface 16x is defined by a circumferential surface 116a of a recess 116 of the drive gear 15. The second slide surface 17x is defined by a circumferential surface 117b of a protrusion 117 of the drive gear 15. The recess 116 of the drive gear 15 is a round pit extending about the second rotation axis CC. The protrusion 117 of the drive gear 15 is a round projection extending about the second rotation axis CC. The shaft hole 15d of the coupling portion 15c receiving the power transmission member 60 extends through the recess 116 and the protrusion 117.

Another example in which the drive gear 15 is rotatably supported will now be described with reference to FIG. 16.

Figure 16:
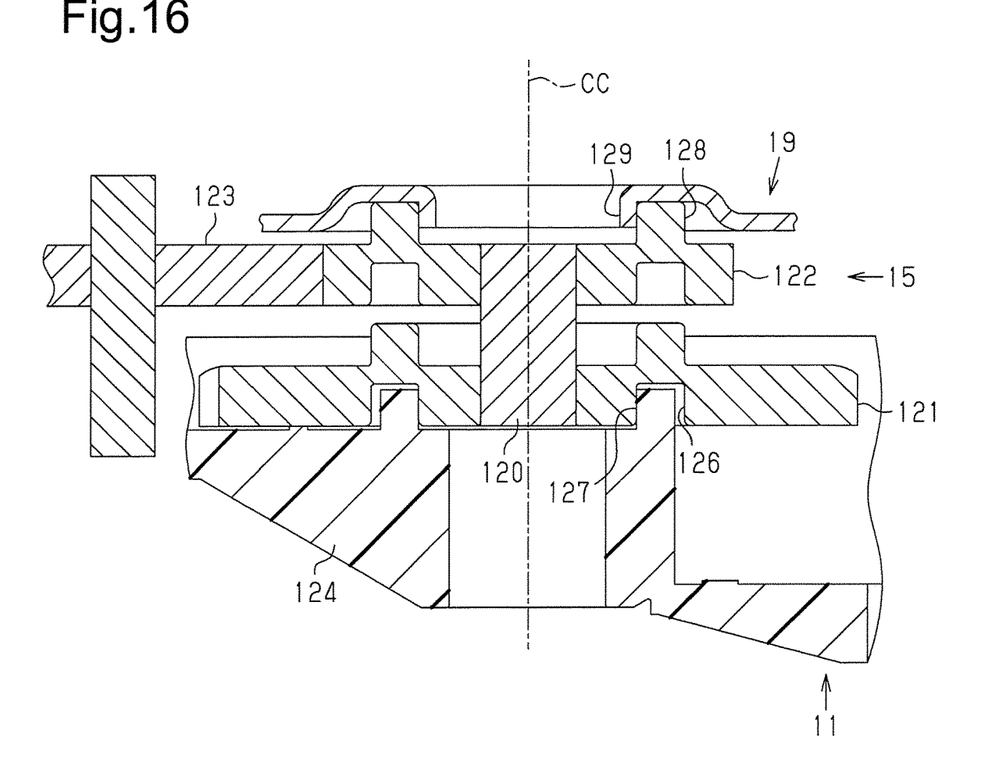
FIG. 16 is a cross-sectional view showing a gear device including a support structure for a drive gear in another embodiment.

In the example shown in FIG. 16, the drive gear 15 includes a plurality of gears. The drive gear 15 includes a first drive gear 121 and a second drive gear 122 that are joined by a joining member 120. The second drive gear 122 is meshed with an additional gear 123 arranged in the gear device 10. The first drive gear 121 includes a surface that opposes a bottom wall 124 of the housing 11 and includes a recess 126. The bottom wall 124 of the housing 11 includes a projection 127 received in the recess 126. The second drive gear 122 includes a surface that opposes the cover 19 and includes a protrusion 128. The cover 19 includes a contact portion 129 that contacts the protrusion 128.

Another example in which the drive gear 15 is rotatably supported will now be described with reference to FIG. 17.

Figure 17:
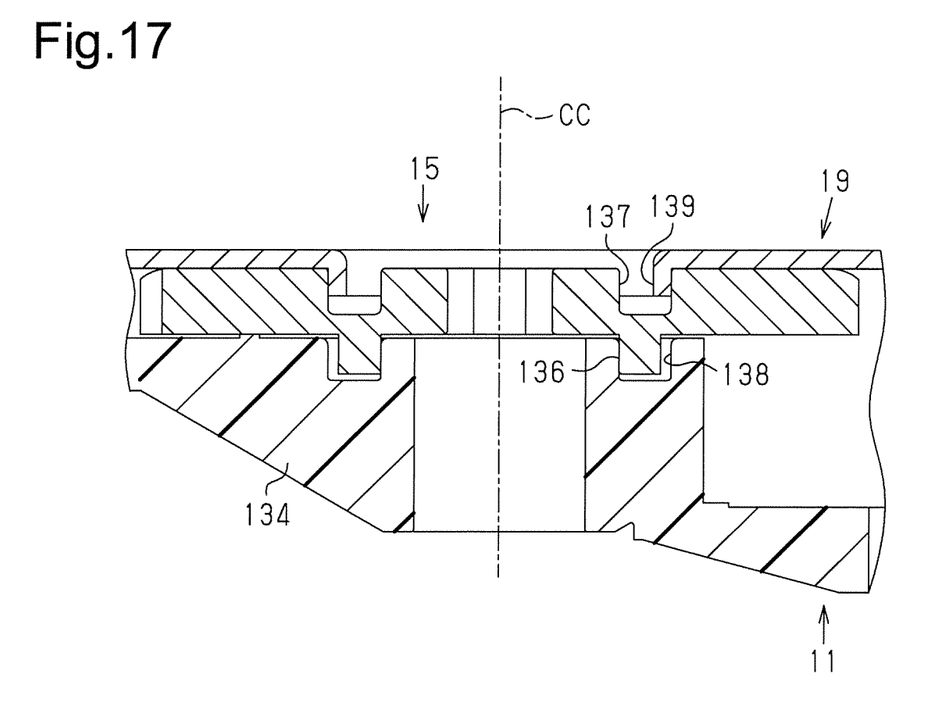
FIG. 17 is a cross-sectional view showing a gear device including a support structure for a drive gear in another embodiment.

In the example shown in FIG. 17, the drive gear 15 includes a surface that opposes a bottom wall 134 of the housing 11 and includes a protrusion 136. The drive gear 15 includes a surface that opposes the cover 19 and includes a recess 137. The bottom wall 134 of the housing 11 includes a contact portion 138 that contacts the protrusion 136 of the drive gear 15. The contact portion 138 is an annular groove formed in the bottom wall 134. The cover 19 includes a projection 139 received in the recess 137 of the drive gear 15.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

What is claimed is:

1. A gear device, comprising:
a housing;
a cover that covers an opening of the housing and is fixed to the housing so as to be non-rotatable with respect to the housing; and
a gear accommodated in the housing, wherein
one of the housing and the cover includes a projection projected toward the gear and having a center axis that extends along a rotation axis of the gear,
the gear includes a recess that receives the projection,
the recess is arranged in one of surfaces of the gear in a direction of the rotation axis,
a protrusion coaxial with the recess is arranged on the other surface of the gear in the direction of the rotation axis,
one of the housing and the cover that does not have the projection includes a contact portion that contacts the protrusion of the gear,
the gear includes a central portion defining a coupling portion to which a power transmission member is coupled, and
the recess of the gear is depressed from one of a pair of end faces of the central portion and the protrusion of the gear is projected from an other of the pair of end faces of the central portion.

2. The gear device according to claim 1, wherein, the recess and the protrusion of the gear are located radially outward from the coupling portion.

3. The gear device according to claim 1, wherein, the recess of the gear includes a first slide surface that slides on the projection,
the first slide surface is defined by one of an inner circumferential surface and an outer circumferential surface of the recess of the gear,
the protrusion of the gear includes a second slide surface that slides on the contact portion, and
the second slide surface is defined by one of an inner circumferential surface and an outer circumferential surface of the protrusion of the gear that is opposite to the circumferential surface of the recess defining the first slide surface.

4. A gear device, comprising:
a housing;
a cover that covers an opening of the housing; and
a gear accommodated in the housing, wherein
the housing includes a projection projected toward the gear and having a center axis that extends along a rotation axis of the gear, the gear includes a recess that receives the projection,
the recess of the gear is annular,
the projection of the housing is annular to enter the recess of the gear,
an inner circumferential surface of the projection of the housing slides on the recess so that a portion of the gear that is radially inward of the recess is inserted into an opening of the housing that is radially inward of the projection,
the gear includes a central portion defining a coupling portion to which a power transmission member is coupled, and
the recess of the gear is depressed from one of a pair of end faces of the central portion and the protrusion of the gear is projected from an other of the pair of end faces of the central portion.

5. The gear device according to claim 1, wherein,
an inner circumferential surface of the recess is defined by an outer circumferential surface of the coupling portion, and
an inner circumferential surface of the projection slides on the outer circumferential surface of the coupling portion.

6. The gear device according to claim 4, wherein,
an inner circumferential surface of the recess is defined by an outer circumferential surface of the coupling portion, and
the inner circumferential surface of the projection slides on the outer circumferential surface of the coupling portion.

* * * * *